Jan. 10, 1967    M. E. WALLIS    3,297,809
METHOD OF ENCLOSING AN ARTICLE WITH A LIQUID FILM
Original Filed Dec. 14, 1961    4 Sheets-Sheet 4
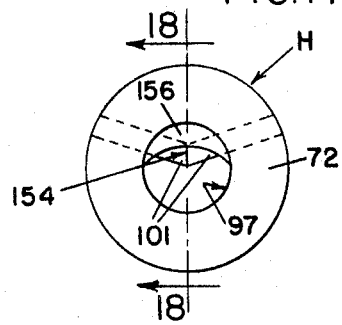
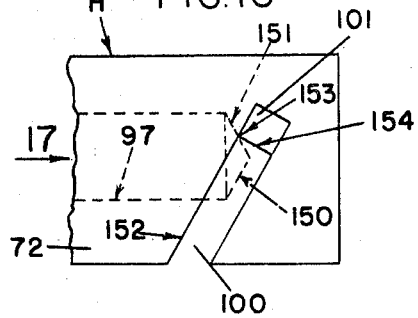
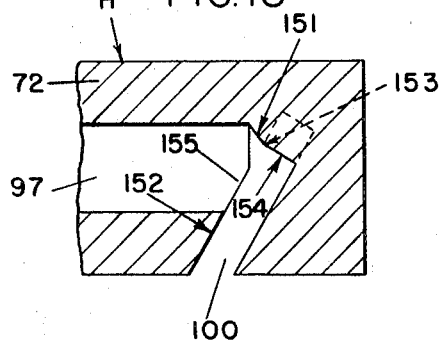
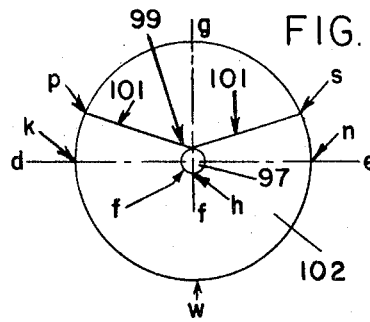
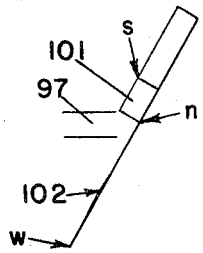
INVENTOR
MARVIN E. WALLIS
Chas. T. Hawley
ATTORNEY United States Patent Office 3,297,809
Patented Jan. 10, 1967

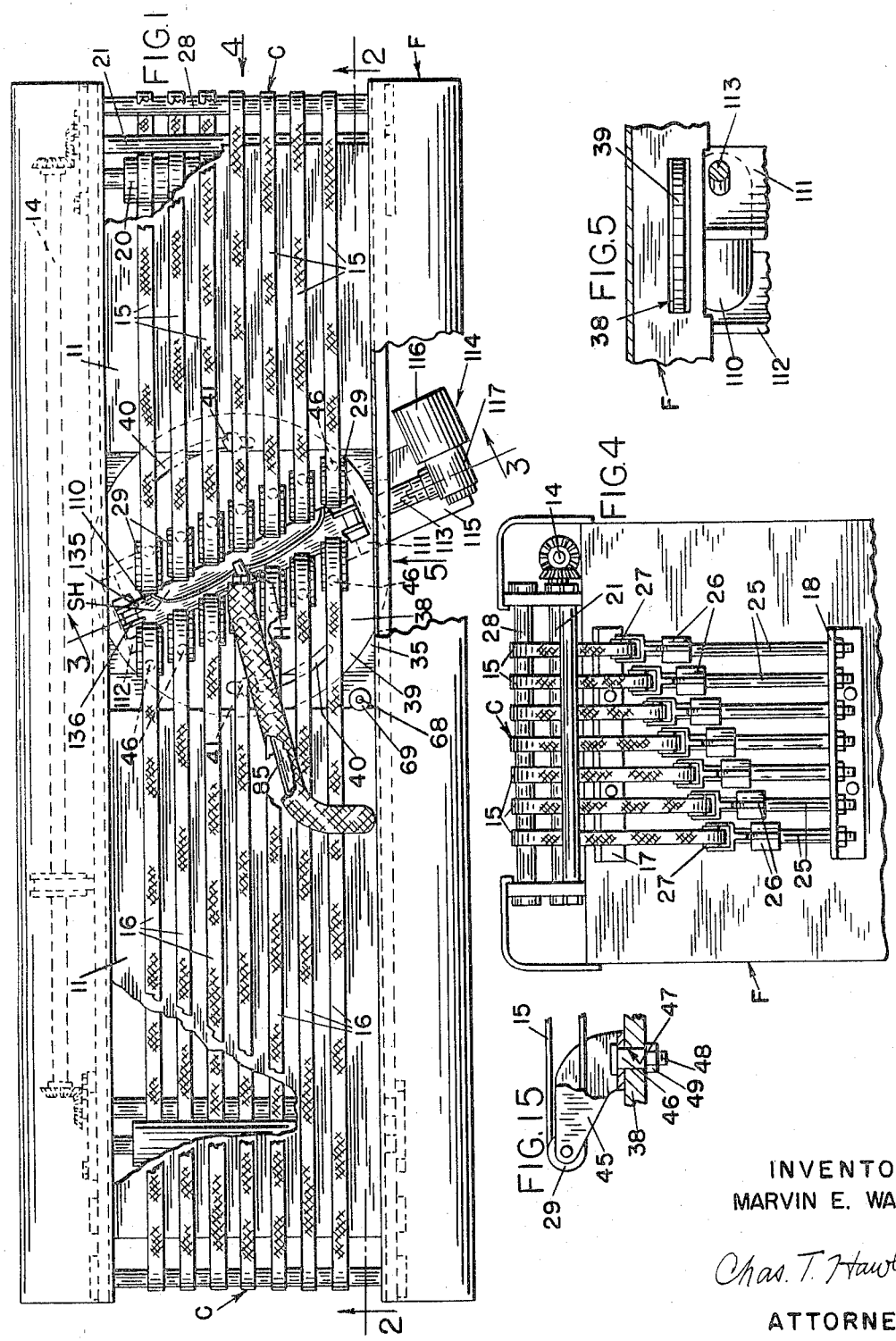

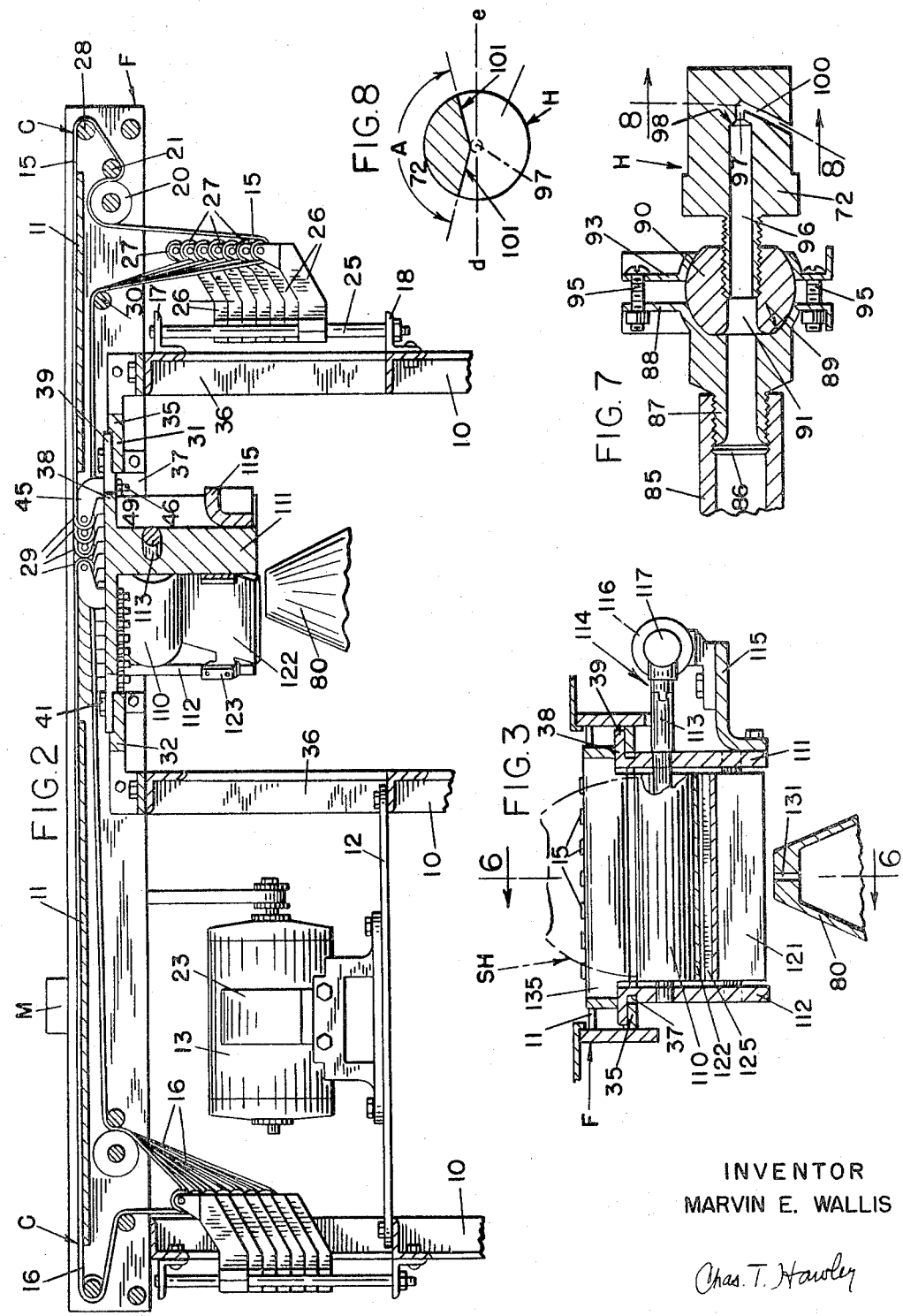

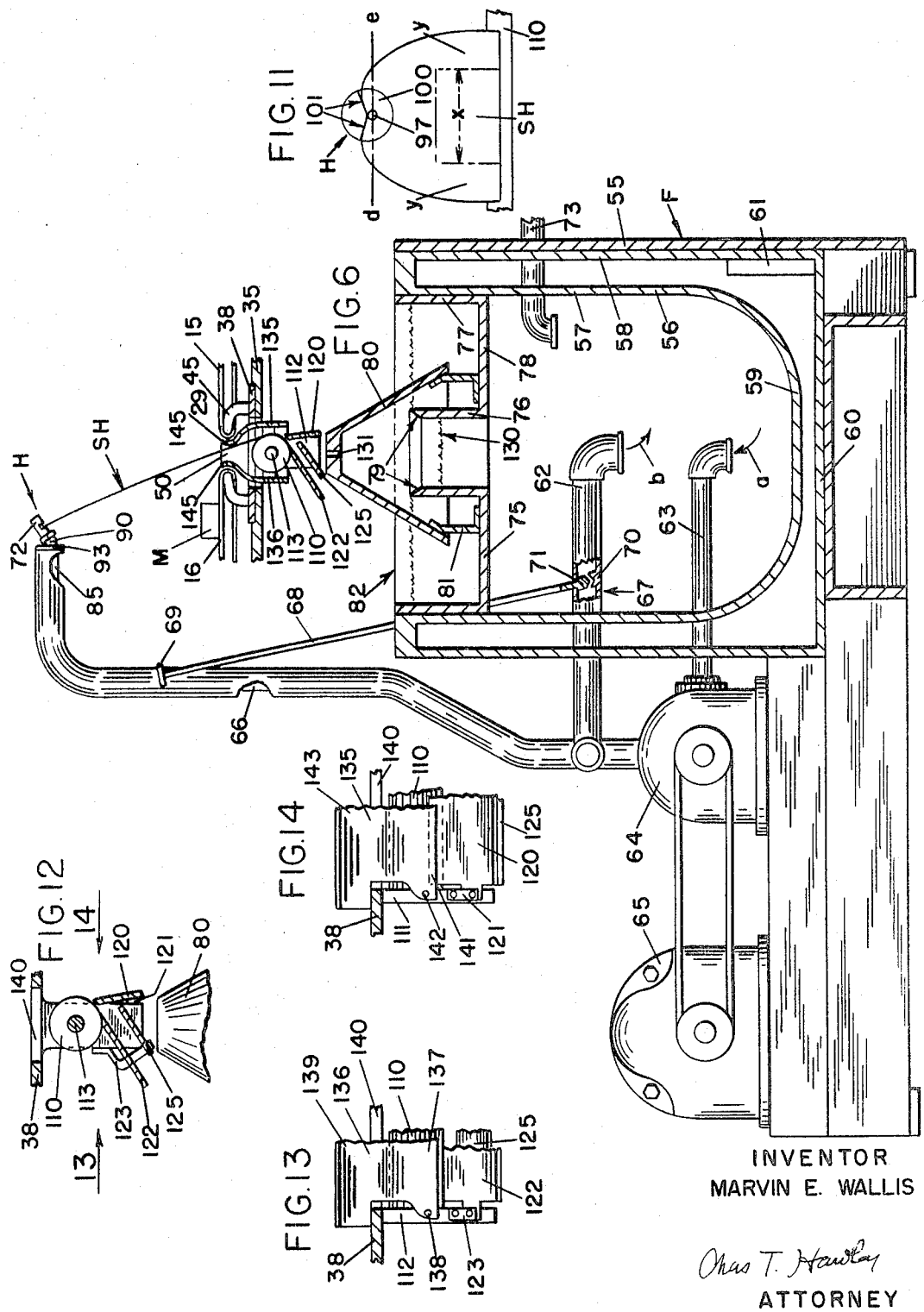

3,297,809
METHOD OF ENCLOSING AN ARTICLE WITH A LIQUID FILM
Marvin E. Wallis, 1643 Woodland Drive,
San Luis Obispo, Calif. 93401
Original application Dec. 14, 1961, Ser. No. 159,355, now Patent No. 3,178,866, dated Apr. 20, 1965. Divided and this application Dec. 13, 1962, Ser. No. 244,312
6 Claims. (Cl. 264—238)

This application is a division of my copeding application, Serial No. 159,355, filed December 14, 1961, now Patent No. 3,178,866, which application relates to improved means and methods for packaging various kinds of articles such, for instance, as those which are presently wrapped. This divisional application relates more particularly to a method of enclosing an article by an extruded thermoplastic material in the form of a continuous film.

Much of the wrapping incident to packaging as practiced today requires the making of a sheet of wrapping material, folding it around the article, tucking the free ends of the sheet under the article, and then heat sealing the tucked under ends. Furthermore, the direction of motion of the article is changed at least twice in the operation of many wrapping machines.

It is an important object of the present invention to make thermoplastic material in film or sheet form and pass an article through the sheet to effect an enveloping and/or packaging operation without requiring a folding operation and preferably without changing the direction of motion of the article.

It is a further object of the invention to provide a downwardly directed film or sheet of molten thermoplastic material and move an article through it in such manner as to cause the sheet to wrap around the article and form an airtight enclosing adherent wrapping.

It is another object of the invention to move the article by means of two conveyors the adjacent ends of which at a wrapping station are separated by a narrow space through which the aforesaid sheet can pass and fall into a tank between successive arrivals of articles at the wrapping station.

Some articles to be wrapped are of such length, or are presented to the machine in such manner, that they cannot conveniently be set obliquely on the conveyor. In order to establish an oblique relation between the sheet and article it is a further object of the invention to alter the arrangement of the conveyors so that the aforesaid space is oblique with respect to the path of travel of the article, and also change the angle of the sheet so that it can coat an approaching corner of the article. The unused material can then pass through the space and into the tank. In this way a straight across leading edge of an article can engage the sheet progressively.

It is a further object of the invention to provide a roll to which the sheet will adhere and turn the roll so that it can tension the sheet and also collect unused material and present it to doctor blades for return to the tank.

It is another object of the invention to move the molten material over means, such as knife edges, which have the effect of bursting air bubbles to permit escape of the air before it can be entrapped in the material in the tank.

Referring again to the oblique space, some articles, such for instance as slices of bacon, are dropped on a conveyor one by one but will be packaged in a group. An attempt to lay each slice on the conveyor at an angle but with their ends aligned parallel to the direction of travel would produce a package of rhomboid form that would not stack economically. By using the angular space and sheet the slices can be at right angles to the conveyor and the packages can have right angled corners so that they can be stacked efficiently. In this connection, it is a further object of the invention to mount the aforesaid roll and the aligned pulleys for plural conveyor belts on a rotatable ring or carrier which when turned keeps the roll and space parallel to receive the plastic sheet which will be adjusted to have its plane parallel to the roll and space.

It is a still further object of the invention to provide an improved extruder head made in such manner as to produce a broad sheet and mounted so as to be adjustable angularly to change the plane of the sheet around horizontal and vertical axes.

The thermoplastic material may be any suitable plastic having the correct melt index, viscosity, transparency or color, tensile strength, resistance to passage of air or water, etc. Polyethylene has been used in the practice of the invention. This material melts at about 350° F. and has a viscosity of about 8000 to 10,000 centipoises and will produce a sheet having a thickness from ½ to 1½ mils. Other materials which may be used include liquid saran (polyvinylidene), polyvinyl chloride if highly plasticized, polypropylene, polystyrene, ethylene copolymers, etc.

In order that the invention may be clearly understood reference is made to the accompanying drawings which illustrate by way of example one embodiment of the invention and in which:

FIG. 1 is a plan view of a machine having the invention applied thereto, certain of the parts being broken away and in cross section for the sake of clarity, FIG. 2 is a vertical section taken on line 2—2 of FIG. 1, FIG. 3 is a transverse vertical section taken on line 3—3, FIG. 1, FIG. 4 is an end elevational view looking in the direction of arrow 4, FIG. 1, FIG. 5 is a fragmentary front elevational view looking in the direction of arrow 5, FIG. 1, FIG. 6 is a sectional view on line 6—6 of FIG. 3, FIG. 7 is a cross sectional view of the head and associated parts, FIG. 8 is a section taken on line 8—8, FIG. 7, FIGS. 9 and 10 are diagrammatic views of an enlargement of FIG. 8 and a side view thereof respectively, FIG. 11 is a diagrammatic view illustrating a sheet of the thermoplastic material of the form produced in the present invention, FIG. 12 is a fragmentary view of the upper part of FIG. 6 with certain of the parts being omitted, FIGS. 13 and 14 are end views looking in the direction of arrows 13 and 14 respectively of FIG. 12, FIG. 15 is a detailed view partly in section of one of the supporting bearings for the conveyor, FIGS. 16-18 are diagrammatic views showing the method of manufacturing the head, FIG. 17 is taken looking in the direction of arrow 17, FIG. 16 and FIG. 18 is a view taken along line 18—18 of FIG. 17.

Referring particularly to FIGURES 1, 2 and 3, the frame F of the machine has legs 10 and a table top 11 supports on the legs and has also a shelf 12 which supports an electric motor 13 operatively connected to a driving shaft 14 journaled on the frame.

Conveyor

The conveyor C for the articles to be wrapped includes two sets of narrow endless belts, the belts of each set preferably aligning with corresponding belts in the other sets. Each set comprises belts which are in side by side relation and for the most part parallel. The right and left-hand belts 15 and 16 respectively are similar and one set, the one to the right in FIG. 1, will be described in detail.

All of the belts 15 pass between a freely rotatable roll 20 and a driving pinch roll 21 connected operatively to shaft 14. When the motor 13 is running the rolls cause linear travel of the belts at a rate which is adjustable by a rate changer 23 connected operatively between roll 21 and the motor.

A stationary vertical guide rod 25 fixed to frame F at 17 and 18 is provided for each belt and has slidable on it a weighted compensator 26 having mounted thereon a freely turning roll 27 under which the corresponding belt runs. The latter extends upwards and passes over a bar 28 and then extends towards the center of the table. The belt then passes under an adjustably mounted pulley 29 and then over it and to the right over the table. The belt then passes around a guide rod 30 and then goes to the rolls 20 and 21, thus completing its circuit.

Sub table 35 below table top 11 is mounted on uprights 36 and has cross plates 31 and 32 each having a circular opening or bearing 37 in which is rotatable a ring 38. The latter has a horizontal flange 39 formed with arcuate slots 40 through which extend bolts 41 which are fastened to the cross plates 31 and 32. When the bolts 41 are loosened the ring 38 can be turned on the cross plates to any desired adjusted angular position, after which the bolts can be tightened to hold the adjustment.

The pulleys 29 are rotatably mounted on bearings 45 adjustable angularly on the ring. Each bearing has a vertical stud 46 rotatable in a hole 47 in ring 38 and a reduced screw 48 on which is threaded a clamp nut 49 which engages the underside of the ring and can be tightened to hold the bearing in adjusted angular position. The angular setting of the pulleys 29 must be adjusted for any appreciable change in the angular position of the ring 38 to insure proper running of the belts. The axes of the pulleys should be approximately at right angles to the belts whatever the position of the ring.

It is to be understood that there are two rows of bearings separated from each other to define an elongated space 50 between them across which an article to be packaged can be passed from one set of belts to the other. The normal setting of the belts and pulleys 29 may be assumed to be that in which the crosswise space 50 is at right angles to the direction of travel of the belts. When it is desired to make the space 50 oblique relative to the belts the ring will be turned and there will be a vertical motion of the compensators 26, some rising and some falling. Thus, if the ring is turned to the position shown in FIG. 1 the upper of the belts 15 will move to the left and their compensators 26 will rise along their guide rods 25, but the lower belts 15 will move to the right and their compensators will move down. A corresponding condition will exist for the belts 16.

*Plastic sheet producer*

The mechanism for making the film or sheet of thermoplastic material includes a tank and heater to supply the molten material, an extruder head to discharge the sheet downwardly across the path traversed by the article to be packaged, provision for tensioning the sheet, and means to return the unused material to the tank.

Referring to FIGURES 2 and 6, there is shown a wall 55 enclosing a tank 56 having inner and outer shells 57 and 58, respectively, and bottoms 59 and 60 for confining heated oil. The oil can be heated in any approved manner, as by electric heater 61. The jacket is entered by upper and lower pipes 62 and 63 respectively, the latter of which leads to a pump 64 belt driven by a motor 65. Leading upwardly from the pump is a pipe 66 which is connected to pipe 62 and continues upwardly as shown in FIGURE 6. Pipe 62 has therein a valve 67 controllable from above the jacket by rod 68 and hand grip 69. The valve has a conical seat 70 secured to pipe 62 and a valve head 71 which by turning rod 68 can be moved into the seat to close pipe 62, or be moved away from the seat to open the pipe. Valves of this type are well known. Inlet pipe 73 affords means for introducing fresh plastic material into the tank to compensate for that used up in the operation of the machine.

The amount of molten thermoplastic material which rises in pipe 66 toward the extruding head H is determined by the position of valve 67. If the valve is wide open there will be local circulation in the tank, molten material entering pump 63, see arrow *a*, FIGURE 6, going through the pump and then through the valve and out of pipe 62, see arrow *b*. Little or no material reaches the head H under these conditions. If, on the other hand, valve 67 is partly closed, molten material will rise to head H to produce a sheet, as will be described. Complete closure of valve 67 will effect delivery of molten material to head H under full pressure of the pump 64. Full pressure can be varied by changing the speed of motor 65, or in any manner which will change the operating conditions of the pump. During heating of the thermoplastic material up to operating temperature, or under other non-operating conditions, the pump will be idle, or be operated slowly with valve 67 wide open.

Secured within the upper part of the tank is a well 75 of ring-like shape having inner and outer circular vertical walls 76 and 77 jointed by a bottom 78. The outer wall 77 is secured to inner wall 56 of the tank and the upper edge of the inner wall 76 is sharpened to a knife edge 79. A hollow cone 80 is placed as shown in FIGURE 6 and is held in position by feet 81 which are fastened to the inner part of the cone and to the floor 78 of the well. The knife edge 79 is lower than the top 82 of the tank and the bottom of the cone extends below the level of material normally in the well. The cone 80 serves as a deflector for hardened resin falling from above and requires the resin to move into the well and prevents it from falling into the tank.

The extruding head H is shown in FIGURES 7–10 and 16–18. The upper end 85 of pipe 66 has internal screw threads 86 which receive the screw threaded nipple 87 of a clamp member 88 having a concave spherical surface 89 into which fits a ball 90. A passage 91 through the ball is screw threaded to receive the externally threaded end of body 72 forming part of head H. A second clamp member 93 also has a concave spherical surface to fit the ball, and bolts or screws 95 clamp the members 88 and 93 together tightly to provide a tight leak-proof adjustable connection between pipe 85 and body 72. The ball 90 permits limited universal adjustment of the body 72 to accommodate the latter to a variety of operating conditions.

The body 72 has a cavity 96 from which leads a short small passage 97. The end of cavity 96 is cone-shaped as at 98 to cause the molten plastic material under pressure to move toward the passage 97. A transverse oblique slot 100 communicates with passage 97 and extends downwardly and is inclined rearwardly or in a direction the opposite to that in which the molten material approaches passage 97, as viewed in FIG. 7.

FIGURE 8 shows a significant feature of the slot 100. The transverse areas 101 which define the upper configuration of the interior of slot 100 are at an angle A to each other less than 180°, preferably about 140°, and this angle is bisected by a vertical line of passing through the axis of passage 97. The vertex of this angle is indicated at 99 in FIGURE 9. The angle between the slot 100 and the axis of body 72 as viewed in FIGURE 7 is about 60°. This angle in cooperation with surfaces 101 requires some at least of the molten plastic material to reverse its direction of flow and emerge from slot 100 in a generally left-hand direction as shown in FIGURE 7.

FIGURES 9 and 10 show diagramatically an enlargement of FIGURE 8 and an enlarged side view of FIGURE 8, respectively. FIGURE 11 shows an elevation of a sheet of thermoplastic material of the form produced by the present invention. In FIGURE 9 line *d–e* passes horizontally through the small circle *f* representing the stream of molten material in passage 97. Vertical line *fg* intersects the circle of the body at *h*, and line *d–e* intersects the circle at *k* and *n*. The lines *fp* and *fs* represent the upper transverse limiting edges 101 of the slot 100. The lowest point of the slot is represented at *w* in FIGURES 9 and 10.

*Tension of plastic sheet*

The head H, which defines in general the locale of extrusion of the film, is adjusted so that the film or sheet SH of molten thermoplastic material can be directed into the space 50 between the ends of the belts 15 and 16. Directly under this space there is mounted a roll 110 which turns below the belts 15 and 16 but above the cone 80. As shown in FIGURES 1 and 12, this roll is mounted for rotation in bearings 111 and 112 depending from ring 38. The axis of the roll is parallel to the length of space 50 and the roll has a shaft 113 to which is connected a driver 114. The latter is supported on a bracket 115 secured to bearing 111 and includes a motor 116 and a gear reducer 117 driven by it and connected to shaft 113.

The rate at which roll 110 turns is such that its peripheral speed will be somewhat more than the rate of travel of sheet SH toward it. Because of this relation in rates the sheet will be under some tension which tends to orient the particles of which the sheet is made, and also tends to make the sheet transparent. The roll is able to tension the sheet SH due to the fact that the latter is adhesive and sticks to the cylindrical surface of the roll. The periphery of the roll can be considered to be a traveling surface, and the roll acts as a draft means on the film, drawing it out as a substantially planate continuous film or sheet.

In order to remove the plastic material which accumulates on the roll there are provided scraper or doctor blades shown in FIGURES 12–14. A primary blade 120 is held in place on small supports 121, one for each of the bearings 111 and 112. The upper edge of this blade does not normally touch the roll but is spaced from it slightly so as to cut off the outer part of the accumlated plastic. The remainder of the plastic is removed by a secondary blade 122 which is mounted on supports 123 secured to bearings 111 and 112 similarly to blade 120 and supports 121. This second blade is set closer to the roll than is blade 120 and normally engages the roll to scrape off all the remaining plastic material. A guide plate 125 mounted as shown close to the secondary blade directs material removed by it to the left-hand side of the cone 80 as viewed in FIGURE 12.

The plastic material which is scraped from roll 110 falls on cone 80 and then moves into the well 75. The level of molten material in the tank is maintained high enough, as at line 130, so that its heat will keep the material in the well fluid and enable it to melt material entering the well from the cone. As material falls into the well it carries air bubbles with it and also causes the molten material already in the well to flow over air releasing knife edge 79 and into the tank, which is a receiver for air-free resin. A vent 131 in the top of cone 80 prevents formation of an air trap which would otherwise interfere with passage of material from the well over edge 79.

FIGURES 6, 13 and 14 show shields which serve to prevent the plastic sheet from getting onto the belts 15 and 16, thus protecting the latter from undesired accumulation of resin. The right and left-hand shields 135 and 136 respectively are supported from the bearings 111 and 112. FIGURE 13 shows one end of shield 36 but it is to be understood that the opposite end is the same except of the opposite hand. Likewise, FIGURE 14 shows only one end of shield 135, but it will be understood that the other end is the same except of opposite hand.

The lower edge 137 of shield 136 is fastened at 138 to the bearings 111 and 112, bearing 112 only being shown in FIGURE 13, and the upper edge 139 of shield 136 extends through a slot 140 in ring 38. Similarly, the lower edge 141 of shield 135 is fastened at 142 to the bearings 111 and 112, bearing 111 only being shown in FIGURE 14, and the upper edge 143 of shield 135 projects up through slot 140. The upper edges of the shields are oppositely curved at 145 as shown in FIGURE 6 to partly at least enclose the adjacent ends of the belts 15 and 16. The previously mentioned space 50 is defined by the curved edges 145. The lengthwise centerline of this slot is slightly to the right of a vertical plane passing through the axis of roll 110.

Returning to the extruding head H, part of the method of its manufacture is shown in FIGURES 16–18. These figures are enlarged views showing diagrammatically how the drilling and slot cutting operations are done. The passage 97 is made by a drill the cutting edges of which are at an oblique angle to the drill axis and leave a concave cone 150 indicated in FIGURE 16. The elements of the cone, as 151, are at about 60° to the axis of passage 97.

Slot 100 is then cut at an angle of about 60° to the axis of passage 97 to a depth of slightly more than half the diameter of body 72. The left-hand side 152 (FIGURE 16) of the slot cuts across the concave cone about as shown in FIGURE 16 at some such point as 153 on element 151. The height of slot 100 at this point in the process is indicated by line 154. Then by two subsequent cutting operations slot 100 is extended obliquely upwardly on each side of the center line *fg* to form the sides or walls 101 already mentioned. Cutting of the slot removes the lower part of the concave cone and cuts back somewhat into the cylindrical part of passage 97, as at 155.

At the upper part of the right-hand end (FIGURE 18) of passage 97 there is a surface 156 inclined downwardly and away from the open end of cavity 96, being the remainder of the concave cone already mentioned. It serves to deflect downwardly into slot 100 molten plastic material moving out of the passage 97. The surfaces 101 (FIGURE 17) define the upper internal boundaries of slot 100 and form angle A against which the downwardly deflected material impinges. The walls 101 serve to deflect laterally molten material moving toward them. These downward and lateral deflections combine to give the film or sheet SH the form shown in FIGURE 11. The axis of the conical surface coincides with the axis of bore 97 and extends across slot 100.

The body 72 is preferably cylindrical and due to the angle of slot 100 the distance from the central axis of body 72 to the surface of the latter, measured along slot 100 to point *w*, is greater than the distance measured horizontally. Since slot 100 has parallel sides more resistance is offered to movement of resin to point *w* than to points *k* and *n* and this difference compensates for the fact that the shorter central part of the film, FIGURE 11, requires less material than does the outer curved part.

It is believed that the operation of the machine will be apparent from the foregoing description. After the plastic material has reached its proper temperature, such for instance as 350°, and the pump has been set in operation to develop a pressure ranging from 250 p.s.i. to 1000 p.s.i. and valve 67 closed, a liquid film of the plastic material will issue from the slot 100 and be projected downwardly toward the slot 50. If the article to be coated is comparatively small and can be set obliquely or diagonally on the conveyors, it may be set in that position and the slot 50 will then be at right angle to the direction of travel, but if for any reason the article is too long or is presented to the conveyor belts in such manner as to require that the angle of the sheet be changed, then the ring can be adjusted to the desired angle. The angle of the extruding head H will be adjusted to conform to that of the slot 50. During the adjustment of the conveyor the weighted compensators will either rise or fall, as the case may be, so that all of the belts will be kept taut.

During operation of the machine the article M to be coated will be placed on the conveyor belts 16 and as shown in FIGURES 1 and 2 will be moved from left to right. The rotating roll 110 will tend to tension the liquid film or sheet SH and will strengthen it and at the same time tend to make it more transparent. As the article approaches the sheet, the leading upper part will strike the sheet and as the article continues to move part at least of the sheet will be deposited on and around it and as the article passes through the enveloping zone it will be transferred from belts 16 to belts 15.

As the film leaves the top of the package it will follow down along the trailing end of the package and upon reaching the bottom of the package will break away from the latter and reestablish its contact with the roll before the next article arrives. If the package is placed on the conveyor obliquely with a corner leading then the top and two sides will be enveloped by a single pass and a second pass, with the package reversed and inverted, will complete the operation.

As the machine continues to run some of the resin or plastic material will accumulate on roll 110 and will be removed and fall into the well where it will be melted sufficiently to pass over the knife edge 49 of the well. This edge will have the effect of requiring the molten material to become very thin and bend down at a sharp angle so that any bubbles or air accumulations in the resin will in all likelihood burst so that upon arrival at the tank the material will be substantially free from occluded air.

Reference to FIGURE 11 will call attention to another feature of the invention. Prior to arrival of an article M at the film SH the latter will be a continuous sheet connected adhesively for its full width to roll 110. When the article M moves into the film the latter will be interrupted for the width of the article, as for instance for the space x and the film will lose its contact with roll 110 for this portion of its width. The parts y of the film beyond, or at the sides of, space x will, however, remain in contact with the roll, and as the article leaves the film these parts, still connected to the upper part of the film, will draw the intermediate part of the film back to the roll.

The invention is not limited to the specific matter already described. Thus, the resin in the tank can be heated in any approved manner and appropriate electric circuitry can be employed for the various drives and heaters. Pressure gauge and thermometer means are used where needed. Pipes 66 and 85 can be enclosed in heat insulation jackets, heated if necessary. A variety of shapes of articles can be enveloped, those of rectangular form when not too large being placed obliquely on the conveyor. When the package is of a shape or assembly on the conveyor not favorable to locating the space 50 straight across the path of travel of the conveyors the ring and head can be adjusted so that the film will be oblique with respect to the article, thus attaining the same advantage as though a corner were presented to a straight across film.

It has already been stated that the rate of travel of the periphery of roll 110 is greater than the rate of travel of the film toward the roll in order to tension the film to orient it, but it should be noted that the articles being enveloped can also be moved at a rate greater than that of the film.

Having now particularly described and ascertained the nature of the invention and in what manner the same is to be performed, what is claimed is:

1. The method of coating an article including the following steps:
    (a) continuously extruding molten highly viscous thermoplastic material to form a film of substantial width,
    (b) exerting a tension force on the film being extruded at the extremities of said width and therebetween to cause said film normally to be disposed in a plane,
    (c) passing said article through said plane in contact with a portion of the width of the film lying within said extremities to deposit material on and around the article, said material in the film tending to wrap around the article and follow its trailing edges as it departs from said plane and then breaking away from the article to resume a path along said plane.

2. The method of coating an article including the following steps:
    (a) continuously extruding molten highly viscous thermoplastic material to form a film of substantial width,
    (b) exerting a tension force on the film being extruded at the extremities of said width and therebetween to cause said film normally to be disposed in a plane,
    (c) passing said article through said plane in contact with a portion of the width of the film lying within said extremities and between the extrusion and the tension-exerting locations to deposit material on and around the article, said material in the film tending to wrap around the article and follow its trailing edges as it departs from said plane and then breaking away from the article to resume a path along said plane between said locations.

3. The method set forth in claim 2 wherein the thermoplastic material is polyethylene.

4. The method set forth in claim 2 wherein the thermoplastic material is polypropylene.

5. The method set forth in claim 2 wherein the article is of less width than the film so that part of the latter remains subject to said tension as the article passes through the plane of the film and said part assists in restoring tension to the whole film after the article has passed.

6. The method set forth in claim 2 wherein the film is extruded at a given linear rate and the article passes through the plane of the film at a faster rate.

References Cited by the Examiner

UNITED STATES PATENTS

| 2,322,827 | 12/1939 | Carver. | |
| 2,329,421 | 9/1943 | Shields. | |
| 2,599,493 | 6/1952 | Slaughter | 264—4 |
| 2,963,002 | 12/1960 | Glaus. | |
| 3,008,834 | 11/1961 | Wallis | 264—238 |
| 3,008,836 | 11/1961 | Wallis | 264—238 |
| 3,061,446 | 10/1962 | Norman et al. | 99—171 |

FOREIGN PATENTS 601,344 7/1960 Canada.

ROBERT F. WHITE, *Primary Examiner.*

ALEXANDER H. BRODMERKEL, *Examiner.*

F. MARLOWE, L. S. SQUIRES, *Assistant Examiners.*